US012561203B2

(12) United States Patent
Kim et al.

(10) Patent No.: US 12,561,203 B2
(45) Date of Patent: Feb. 24, 2026

(54) MEMORY SYSTEM FOR PERFORMING READ RECLAIM

(71) Applicant: SK hynix Inc., Gyeonggi-do (KR)

(72) Inventors: Jung Ae Kim, Gyeonggi-do (KR); Tae Ha Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 28 days.

(21) Appl. No.: 18/610,279

(22) Filed: Mar. 20, 2024

(65) Prior Publication Data

US 2025/0130896 A1 Apr. 24, 2025

(30) Foreign Application Priority Data

Oct. 23, 2023 (KR) ........................ 10-2023-0141913

(51) Int. Cl.
*G06F 11/10* (2006.01)
*G06F 13/18* (2006.01)

(52) U.S. Cl.
CPC ...... *G06F 11/1068* (2013.01); *G06F 11/1016* (2013.01); *G06F 13/18* (2013.01)

(58) Field of Classification Search
None
See application file for complete search history.

(56) References Cited

U.S. PATENT DOCUMENTS

| | | | | |
|---|---|---|---|---|
| 10,025,531 B2 | 7/2018 | Yoon et al. | | |
| 2014/0281819 A1* | 9/2014 | Wood | .................. | G06F 11/1048 |
| | | | | 714/773 |
| 2017/0132125 A1* | 5/2017 | Cai | ..................... | G06F 12/0261 |
| 2017/0177425 A1* | 6/2017 | Jei | ........................... | G06F 11/076 |
| 2019/0354476 A1* | 11/2019 | Park | ....................... | G06F 3/0655 |
| 2020/0356438 A1* | 11/2020 | Kim | ........................ | G06F 3/064 |
| 2021/0202012 A1* | 7/2021 | Han | ......................... | G11C 16/26 |
| 2022/0188269 A1* | 6/2022 | Yamamoto | ............ | G06F 3/0685 |
| 2023/0120184 A1* | 4/2023 | Kachare | .................. | G06F 3/061 |
| | | | | 711/154 |

FOREIGN PATENT DOCUMENTS

KR 10-2019-0075353 A 7/2019

OTHER PUBLICATIONS

C.-W. Tsao, Y.-H. Chang, M.-C. Yang and P.-C. Huang, "Efficient Victim Block Selection for Flash Storage Devices," in IEEE Transactions on Computers, vol. 64, No. 12, pp. 3444-3460, Dec. 1, 2015, (Year: 2015).*

* cited by examiner

*Primary Examiner* — Daniel F. McMahon
(74) *Attorney, Agent, or Firm* — IP & T GROUP LLP

(57) ABSTRACT

Disclosed is a memory system including a memory device including a plurality of memory blocks, and a controller suitable for controlling the memory device to perform pre-read reclaim on pre-victim blocks of pre-read blocks among the plurality of memory blocks, the pre-victim blocks including uncorrectable errors, the pre-read blocks being blocks on which a pre-read operation has been performed. The memory system performs read reclaim operations to improve the reliability of non-volatile memory. The controller performs the pre-read operation on sequential data stored in the memory blocks and determines pre-victim blocks based on uncorrectable errors detected during the pre-read operation. The controller reorders the reclaim sequence according to a priority among the pre-read reclaim, a normal read reclaim, and an internal read reclaim. These operations reduce read latency and prevent uncorrectable errors.

20 Claims, 12 Drawing Sheets

| Q_OD | BLK_ID | RD_TYPE | nRD |
|------|--------|---------|-----|
| 1st | BLK_6 | NOR | 50 |
| 2nd | BLK_5 | NOR | 80 |
| 3rd | BLK_4 | NOR | 100 |

RE-ODERING

| Q_RE_OD | BLK_ID | RD_TYPE | nRD |
|---------|--------|---------|-----|
| 1st | BLK_4 | NOR | 100 |
| 2nd | BLK_5 | NOR | 80 |
| 3rd | BLK_6 | NOR | 50 |

| Q_OD | BLK_ID | RD_TYPE | nUECC | nRD |
|------|--------|---------|-------|-----|
| 1st | BLK_2 | PRE | 60 | X |
| 2nd | BLK_6 | NOR | X | 50 |
| 3rd | BLK_1 | PRE | 80 | X |
| 4th | BLK_5 | NOR | X | 80 |
| 5th | BLK_3 | PRE | 80 | X |
| 6th | BLK_4 | NOR | X | 100 |

RE-ODERING

| Q_RE_OD | BLK_ID | RD_TYPE | nUECC | nRD | |
|---------|--------|---------|-------|-----|---|
| 1st | BLK_4 | NOR | X | 100 | ⎫ |
| 2nd | BLK_5 | NOR | X | 80 | ⎬ PRIORITY = 1st |
| 3rd | BLK_6 | NOR | X | 50 | ⎭ |
| 4th | BLK_1 | PRE | 80 | X | ⎫ |
| 5th | BLK_3 | PRE | 80 | X | ⎬ PRIORITY = 2nd |
| 6th | BLK_2 | PRE | 60 | X | ⎭ |

MEMORY SYSTEM FOR PERFORMING READ RECLAIM

CROSS-REFERENCE TO RELATED APPLICATION(S)

The present application claims priority under 35 U.S.C. § 119(a) to Korean Patent Application No. 10-2023-0141913, filed on Oct. 23, 2023, the disclosure of which is incorporated herein by reference in its entirety.

BACKGROUND

1. Field

Various embodiments of the present disclosure generally relate to a memory system, and more particularly, to a memory system for performing read reclaim.

2. Description of the Related Art

The computer environment paradigm has changed to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems that have no moving parts provide excellent stability, durability, high information access speed, and low power consumption. Examples of memory systems having such advantages include universal serial bus (USB) memory devices, memory cards having various interfaces, and solid state drives (SSDs).

SUMMARY

Various embodiments of the present disclosure are directed to a memory system that utilizes reliability information calculated during a pre-read operation to determine a pre-victim block on which read reclaim is to be performed.

In addition, various embodiments of the present disclosure are directed to a memory system that determines a priority of a victim block, which is a target of read reclaim, based on a read type and performs the read reclaim according to the determined priority.

An embodiment of the present disclosure can provide a memory system comprising: a memory device including a plurality of memory blocks; and a controller suitable for controlling the memory device to perform pre-read reclaim on pre-victim blocks of pre-read blocks among the plurality of memory blocks, the pre-victim blocks including uncorrectable errors, the pre-read blocks being blocks on which a pre-read operation has been performed.

The controller may control the memory device to perform the pre-read reclaim when the number of read requests from an external device is greater than or equal to a threshold value, and after at least one read reclaim is performed among a normal read reclaim and an internal read reclaim, the normal read reclaim being performed on normal victim blocks on which a normal read operation is performed, the internal read reclaim being performed on internal victim blocks determined during an internal read operation which has been performed.

The controller may control the memory device to perform the pre-read reclaim when force garbage collection is performed.

The controller may process, as bad blocks, pre-victim blocks which store data whose error recovery has failed, among the pre-victim blocks on which the pre-read reclaim has been performed.

The controller may determine a priority of the normal read reclaim and the internal read reclaim to be greater than the pre-read reclaim.

The controller may reorder a read reclaim order based on the priority, the number of read requests updated in real time, and the number of uncorrectable errors, the read reclaim order indicating an order in which each of the pre-read reclaim, the normal read reclaim and the internal read reclaim is performed.

An embodiment of the present disclosure can provide a memory system comprising: a memory device including a plurality of memory blocks; and a controller suitable for: calculating the number of uncorrectable errors included in each of pre-read blocks, determining, as pre-victim blocks, the pre-read blocks including the uncorrectable errors, among the plurality of memory blocks, and controlling the memory device to perform pre-read reclaim on the pre-victim blocks, wherein each of the pre-read blocks stores sequential data when a pre-read operation is determined to be performed.

The controller may perform the pre-read reclaim after a data recovery operation is performed on the pre-victim blocks.

The controller may process, as bad blocks, pre-victim blocks, which store errors that are not recovered through the data recovery operation.

The memory system may further comprise a queue buffer in which pre-victim information on the pre-victim blocks is queued according to a determination order of the pre-victim blocks, and normal victim information on the normal victim blocks is queued according to a determination order of the normal victim blocks.

The controller may reorder queuing orders of the pre-victim information and the normal victim information based on the priority, the number of uncorrectable errors updated in real time, and the number of read requests.

The controller may perform the pre-read reclaim in one of a first state in which the memory system does not perform a data input/output operation with the external device, a second state in which an invalidation level of data stored in the plurality of memory blocks is equal to or less than a predetermined value, and a third state in which force garbage collection is performed, after the normal read reclaim is completely performed.

DETAILED DESCRIPTION

Hereinafter, various embodiments of the present disclosure will be described below in detail with reference to the accompanying drawings. In the following description, only parts necessary for understanding the operation according to the embodiments of the present disclosure will be described, and the description of the other parts will be omitted so as not to obscure the subject matter of the present disclosure.

Figure 1:
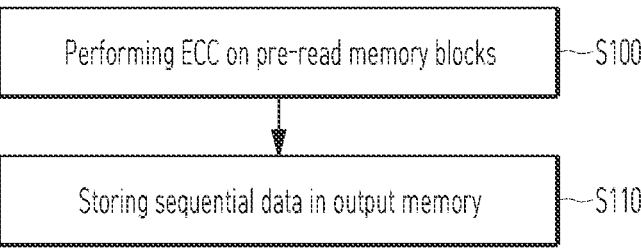
FIG. 1 is a flowchart illustrating a pre-read operation in accordance with an embodiment of the present disclosure.

FIG. 1 is a flowchart illustrating a pre-read operation in accordance with an embodiment of the present disclosure.

There is a high possibility that sequential data stored in memory blocks composed of non-volatile memory cells is requested to be read, by an external device, for example, a host. To reduce read latency for an external read request, a controller for controlling memory blocks may perform a read operation on sequential data in advance before the external read request is received. This is referred to as a pre-read operation.

The controller may perform the pre-read operation on a pre-read block in which the sequential data is stored among the memory blocks. To this end, the controller may perform the pre-read operation on valid data stored in the pre-read block, and perform an error correction code (ECC) operation on the data, which is pre-read, in S100.

The ECC operation refers to an operation of detecting errors by using an ECC code and correcting the detected errors. The controller may determine data containing error bits above a certain level as data containing uncorrectable errors. The controller may calculate the number of uncorrectable errors through the ECC operation. The number of uncorrectable errors may include the number of error bits of the uncorrectable errors included.

The controller may store the sequential data on which error correction has been completely performed in an output memory, in S120. Accordingly, the pre-read operation according to a first embodiment of the present disclosure may be completely performed.

In this embodiment, when a read request for the sequential data stored in the output memory is received from the external device, the controller may transmit, to the external device, the error-corrected valid data stored in the output memory. Thus, the pre-read operation according to the first embodiment may reduce the read latency for the external read request.

When read reclaim has to be performed after the pre-read operation has been performed, the controller may select, as a victim block for the read reclaim, a memory block containing uncorrectable errors from among a plurality of memory blocks. To this end, the controller has to perform the ECC operation for detecting errors on the plurality of memory blocks.

In this case, the controller has to perform the ECC operation again for detecting errors even on pre-read blocks on which the pre-read operation has been performed. That is, since the number of uncorrectable errors calculated through the ECC operation of S100 cannot be used to determine the victim block, an error detection operation has to be performed repeatedly on the pre-read blocks.

When the victim block is not selected during the pre-read operation but is selected for the read reclaim, the victim block may be determined in a state where a degree of damage of data stored in the pre-read blocks is higher than that during pre-read operation.

Figure 2:
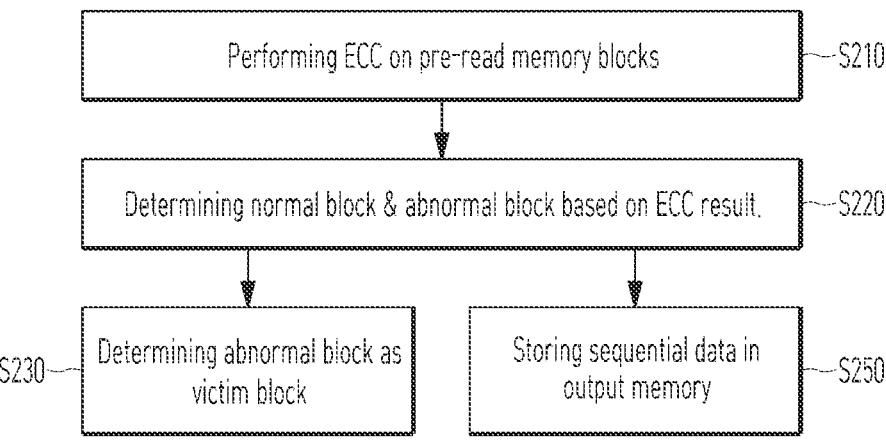
FIG. 2 is a flowchart illustrating a pre-read operation in accordance with an embodiment of the present disclosure.

FIG. 2 is a flowchart illustrating the pre-read operation in accordance with an embodiment of the present disclosure.

In the description of FIG. 2, parts that overlap with those described with reference to FIG. 1 are omitted.

The controller may perform the ECC operation on the pre-read blocks, and calculate the number of uncorrectable errors, in S210.

The controller may divide the pre-read blocks into a normal block and an abnormal block based on the calculated number of uncorrectable errors, in S220. The normal block is a memory block that does not contain the uncorrectable errors, while the abnormal block is a memory block that contains the uncorrectable errors.

The controller may determine the abnormal block as the victim block for the read reclaim in S230.

The controller may store the sequential data, which is stored in the normal block and on which the error correction has been completely performed, in the output memory in S250.

In an embodiment, the controller may select the victim block for the read reclaim based on the number of uncorrectable errors, which is a result of the ECC operation performed during the pre-read operation. Accordingly, when the read reclaim is performed after the pre-read operation is performed, the controller does not need to perform the ECC operation again for determining the victim block on the pre-read blocks on which the pre-read operation has been completely performed.

In a method for performing the pre-read operation according to an embodiment, the victim block for the read reclaim may be determined during the pre-read operation. Accordingly, the victim block may be determined in a state where a degree of damage of data is not severe.

Figure 3:
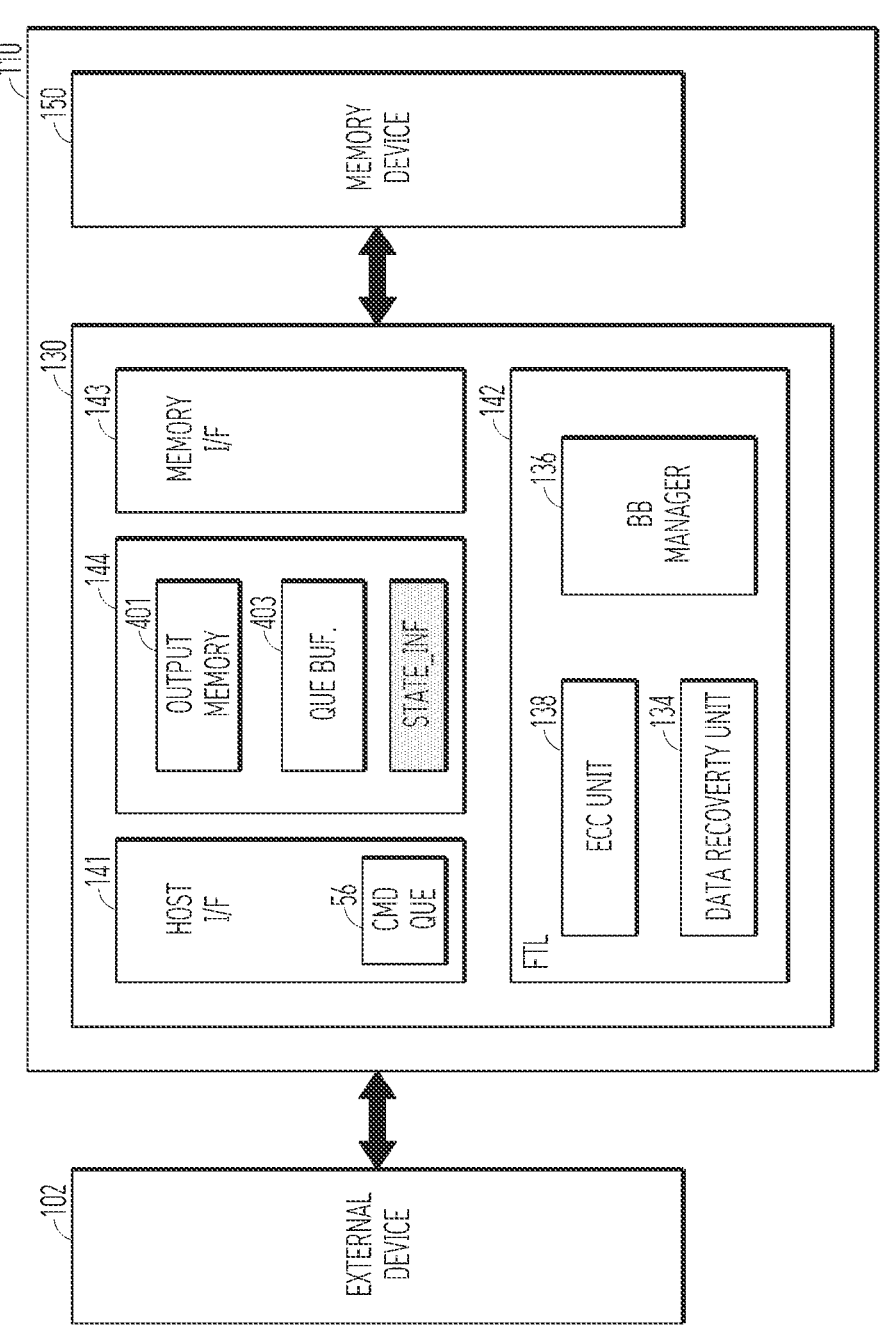
FIG. 3 is a diagram schematically illustrating a data processing system including a memory system in accordance with an embodiment of the present disclosure.

FIG. 3 is a diagram schematically illustrating a data processing system including a memory system in accordance with an embodiment of the present disclosure.

Referring to FIG. 3, a memory system 110 operates along with an external device 102 for performing a data input/output operation. The memory system 110 may include a controller 130 and a memory device 150. The controller 130 includes a host interface (I/F) 141, a flash translation layer (FTL) 142, a memory interface (I/F) 143, and a memory 144.

The host interface 141 may handle commands, data, and the like transmitted from the external device 102. By way of example but not limitation, the host interface 141 may include a command queue (CMD QUE) 56, a buffer manager, and an event queue. The command queue 56 may sequentially store the commands and the data, received from the external device 102, and output the stored commands and data to the buffer manager, for example, in the order in which the commands and data are stored in the command queue 56. The buffer manager may classify, manage, or adjust the commands and the data, received from the command queue 56. The event queue may sequentially transmit events for processing the commands and the data, received from the buffer manager.

A plurality of commands or data of the same characteristic may be transmitted from the external device 102, or a plurality of commands and data of different characteristics may be transmitted to the memory system 110 after being mixed or jumbled by the external device 102. For example, a plurality of commands for reading data, i.e., read commands, may be delivered, or a command for reading data, i.e., a read command, and a command for programming or writing data, i.e., a write command, may be alternately transmitted to the memory system 110. The host interface 141 may sequentially store commands and data, which are transmitted from the external device 102, in the command queue 56. Thereafter, the host interface 141 may estimate or predict what type of internal operations the controller 130 will perform according to the characteristics of the commands and the data, which have been transmitted from the external device 102. The host interface 141 may determine a processing order and a priority of commands, and data based on their characteristics.

According to the characteristics of the commands, and the data, transmitted from the external device 102, the buffer manager in the host interface 141 is configured to determine whether the buffer manager should store the commands, and the data, in the memory 144, or whether the buffer manager should deliver the commands, and the data, to the FTL 142. The event queue receives events, and delivers the events to the FTL 142 in the order of the events input to the event queue. The events may be transmitted from the buffer manager, which are to be internally executed and processed by the memory system 110 or the controller 130 in response to the commands, and the data.

In accordance with an embodiment, the FTL 142 illustrated in FIG. 3 may implement a multi-thread scheme to perform data input and output (input/output) (I/O) operations. A multi-thread FTL may be implemented through a multi-core processor using multi-thread included in the controller 130.

In accordance with an embodiment, the FTL 142 may include a host request manager, a map manager, a state manager, and a block manager. The block manager may include a bad block (BB) manager 136. The host request manager may manage the events transmitted from the event queue. The map manager may handle or control map data. The state manager may perform a read reclaim (RR), a garbage collection (GC) or a wear leveling (WL). The block manager may execute commands or instructions onto a block in the memory device 150.

By way of example but not limitation, the host request manager may use the map manager and the block manager to handle or process requests according to read and program commands and events which are delivered from the host interface 141. The host request manager may send an inquiry request to the map manager to determine a physical address corresponding to a logical address which is entered with the events. The host request manager may send, to the memory interface 143, a read request with the physical address to process the read request, i.e., handle the events. In one embodiment, the host request manager may send, to the block manager, a program request (or a write request) to program data to a specific empty page storing no data in the memory device 150. Then, the host request manager may transmit, to the map manager, a map update request corresponding to the program request in order to update an item relevant to the programmed data, in information of mapping the logical and physical addresses to each other.

The block manager may convert a program request delivered from the host request manager, the map manager, and/or the state manager into a flash program request used for the memory device 150, in order to manage flash blocks in the memory device 150. In order to maximize or enhance program or write performance of the memory system 110, the block manager may collect program requests and send, to the memory interface 143, flash program requests for multiple-plane and one-shot program operations. In an embodiment, the block manager sends several flash program requests to the memory interface 143 to enhance or maximize parallel processing of a multi-channel and multi-directional flash controller.

In an embodiment, the block manager may manage blocks in the memory device 150 according to the number of valid pages, select and erase blocks having no valid pages when a free block is needed, and select a block including the least number of valid pages when it is determined that garbage collection is to be performed. The state manager may perform garbage collection to move valid data stored in the selected block to an empty block and erase data stored in the selected block so that the memory device 150 may have enough free blocks (i.e., empty blocks with no data). When the block manager provides, to the state manager, information regarding a block to be erased, the state manager may check all flash pages of the block to be erased to determine whether each page of the block is valid.

For example, to determine validity of each page, the state manager may identify a logical address recorded in an out-of-band (OOB) area of each page. To determine whether each page is valid, the state manager may compare a physical address of the page with a physical address mapped to a logical address obtained from an inquiry request. The state manager sends a program request to the block manager for each valid page. A map table may be updated by the map manager when a program operation is complete.

The map manager may manage map data, e.g., a logical-physical map table. The map manager may process various requests, for example, queries, updates, and the like, which are generated by the host request manager or the state manager. The map manager may store the entire map table in the memory device 150, e.g., a flash/non-volatile memory, and cache mapping entries according to the storage capacity of the memory 144. When a map cache miss occurs while processing inquiry or update requests, the map manager may send, to the memory interface 143, a read request to load a relevant map table stored in the memory device 150. When the number of dirty cache blocks in the map manager exceeds a certain threshold value, a program request may be sent to the BB manager 136, so that a clean cache block is made and a dirty map table may be stored in the memory device 150.

When garbage collection is performed, the state manager copies valid page(s) into a free block, and the host request manager may program the latest version of the data for the same logical address of the page and concurrently issue an update request. When the state manager requests the map update in a state in which the copying of the valid page(s) is not completed normally, the map manager may not perform the map table update. This is because the map request is issued with old physical information when the state manger requests a map update and a valid page copy is completed later. The map manager may perform a map update operation to ensure accuracy when, or only if, the latest map table still points to the old physical address.

The FTL 142 may include an Error Correction Code (ECC) unit 138, a data recovery unit 134 and the BB manager 136. The ECC unit 138, the data recovery unit 134 and the BB manager 136 may be implemented as a separate module, a circuit, firmware, or the like, which is included in or associated with the controller 130.

The ECC unit 138 can correct error bits of data read from the memory device 150, and may include an error correction code (ECC) encoder and an ECC decoder. Here, the ECC encoder can perform error correction encoding on data that is to be programmed in the memory device 150 to thereby generate encoded data into which parity bits are added, and the encoded data is stored in memory device 150. The ECC decoder can detect and correct error bits contained in the data read from the memory device 150 when the controller 130 reads the data stored in the memory device 150. After performing error correction decoding on the data read from the memory device 150, the ECC unit 138 can determine whether the error correction decoding has succeeded or failed, and output an instruction signal (e.g., an error correction success signal or an error correction fail signal). The ECC unit 138 can use the parity bits, which are generated during the ECC encoding process, to correct the error bits of the read data. When the number of the error bits is greater than or equal to a threshold number of correctable error bits, the ECC unit 138 cannot correct the error bits and instead may output an error correction fail signal indicating failure in correcting the error bits.

In an embodiment of the present disclosure, if the number of errors of data stored in one page is above a certain level, the ECC unit 138 may determine that the certain level exceeded an error correction capability of the ECC unit 138. Accordingly, the ECC unit 138 may determine that the error in the corresponding page is uncorrectable.

Regarding the memory system 110, it is desired to increase data storage capacity while maintaining data accuracy and an input/output speed. To this end, the memory system 110 may use an error correction code (ECC) technique and a signal processing technique to efficiently improve data reliability related to the data accuracy. In another embodiment, the ECC unit 138 may be implemented as a separate module, a circuit, firmware, or the like, which is included in or associated with the controller 130.

A unit of data to which an error correction code (ECC) is applied to detect and correct an error occurring in data is called a codeword. A codeword has a length of n bits. The n bits include user data of k bits and parity data of (n–k) bits. A code rate is calculated as (k/n). The higher the code rate, the more user data can be stored in each codeword. Generally, the longer the codeword and the smaller the code rate, the better the error correction capability of the error correction code (ECC).

The data recovery unit 134 may decode data or information that is read from the memory device 150 and transmitted through a channel. The data recovery unit 134 may include a decoder that performs hard decision decoding or soft decision decoding according to how many bits of data or information, the data or information is represented as. For example, the decoder may perform the hard decision decoding using memory cell output information that is represented as 1 bit. Herein, the 1-bit information may be called hard information. Further, the decoder may perform the soft decision decoding using more accurate memory cell output information that is represented as 2 or more bits. The 2 or more bits of information may be called soft information. The soft decision decoding has a stronger error correction capability than the hard decision decoding. But the soft decision decoding may require high complexity in hardware implementation and/or high memory consumption, as compared with the hard decision decoding. In addition, generation of the soft information may require longer read latency than generation of the hard information.

An operation of reading data stored in the memory device 150 is performed through a word line. Data stored in a plurality of memory cells connected to a single word line may be read at the same time. In a read operation, a reference voltage is applied to a word line. The reference voltage may be compared with a threshold voltage for each memory cell to determine data representing information based on a comparison result. For example, the data stored in each memory cell is determined whether the threshold voltage has a lower or higher level than the reference voltage. Accordingly, one-time sensing (i.e., reading one time) per word line may be required to generate hard information. In the case of generating 2-bit soft information representing 4 levels, a level of the reference voltage is changed or adjusted, and three-time sensing (i.e., reading three times) using different levels of the reference voltage may be performed.

When an error is detected in data read from the memory device 150, the memory system 110 may perform an error correction operation step by step. For example, when an error is found in data read from a single page, the data recovery unit 134 may perform hard decision decoding on the data. If the error in the corresponding data is not corrected through the hard decision decoding, the data recovery unit 134 may alternately perform read bias optimization to adjust a level of a read voltage and the soft decision decoding. However, the read bias optimization and the soft decision decoding may require a relatively large number of sensing (reading) operations on memory cells to recover the data read from the single page, and thus read latency may be increased and quality of data (QOS) may be decreased.

In an embodiment of the present disclosure, when the hard decision decoding fails at least one time, the memory system 110 may utilize chipkill decoding to recover and restore the data read from the single page more quickly and efficiently.

In an embodiment, the chipkill decoding may be performed in any of two different ways or in a combination of the two ways. In an embodiment, how to perform the chipkill decoding may be selected or determined according to a hardware configuration of the memory system 110, but might not be changed through software designed for operations performed by the controller 130.

For applying the chipkill decoding to correct an error, data stored in the memory device 150 may constitute a codeword. The codeword may be a set of data bits and error check bits which an error correction code (ECC) algorithm provides for error detection and correction. The data bits may correspond to user data, and the error check bits may correspond to parity data. For example, 256 (=64×4) bits of data associated with each other are stored in four different locations within the memory device 150. When a user data area of the memory device 150 is designed in a unit of 64 bits, a size of the codeword may be 72 bits which includes a 64-bit user data and an 8-bit error correction data (or parity data). In this case, the memory system 110 may automatically correct an error when the error is a single-bit error and authentically detect a 2-bit error, which is called Single Error Correction/ Double Error Detection (SEC/DED). When errors occur in multiple-bit data read from the four different locations storing 256 bits, the data recovery unit 134 may perform the chipkill decoding to correct the errors included in the 256 bits of data.

In an embodiment of the present disclosure, when the hard decision decoding performed on each codeword fails, the data recovery unit 134 may perform the chipkill decoding after sensing and reading codewords from the four different locations in parallel. Accordingly, it is possible to avoid an increase in read latency and a decrease in quality of service (QOS) that may be generated by performing soft decision decoding after the hard decision decoding.

The memory 144 may be used as a working memory of the memory system 110 or the controller 130, while temporarily storing transactional data for operations performed in the memory system 110 and the controller 130. For example, the memory 144 may temporarily store read data entries output from the memory device 150 in response to a read request from the external device (e.g., host) 102 before the read data entries are output to the external device 102. In addition, the controller 130 may temporarily store, in the memory 144, write data entries input from the external device 102 before programming the write data entries in the memory device 150. When the controller 130 controls operations of the memory device 150, such as a data read operation, a data write or program operation, and a data erase operation, data transmitted between the controller 130 and the memory device 150 of the memory system 110 may be temporarily stored in the memory 144.

In an embodiment, the memory 144 may be implemented with a volatile memory. For example, the memory 144 may be implemented with a static random access memory (SRAM), a dynamic random access memory (DRAM), or both. Although FIG. 3 illustrates the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The memory 144 may store data necessary to perform operations such as a write operation and a read operation between the external device 102 and the memory device 150. The memory 144 may include a program memory, a data memory, a write buffer/cache, a read buffer/cache, a data buffer/cache, map buffer/cache and etc.

The memory 144 may store state information STATE_INF including information necessary for a background operation, a pre-read operation and an error correction operation, and results of the operations. The state information STATE_INF may include the number of uncorrectable errors, sequential information, a read count, a threshold value, and a reference value.

In an embodiment, the memory 144 may include an output memory 401 for storing data to be outputted to the external device 102.

The sequential information may include the number and location of sequential data included in a memory block. The read count may include the number of times that a read operation is performed on the memory block in response to a read request received from the external device 102. The threshold value may be a comparison basis for the read count, and the reference value may be a comparison basis for the number of errors.

The memory 144 may include a queue buffer (QUE BUF.) 403 for storing information regarding victim blocks. The information regarding victim blocks may include information on a pre-victim block determined based on the number of uncorrectable errors calculated during a pre-read operation, information on a normal victim block determined based on the read count, and information on an internal victim block determined based on the number of uncorrectable errors calculated during an internal read operation.

In some embodiments, the information on the pre-victim block, the information on the normal victim block, and the information on the internal victim block are stored separately in different queue buffers.

That is, the information on the pre-victim block, the information on the normal victim block, and the information on the internal victim block may be stored separately in different queue buffers. Alternatively, the information on the pre-victim block, the information on the normal victim block, and the information on the internal victim block may be stored in a single queue buffer.

The memory device 150 may include a plurality of memory blocks, such as a single level cell (SLC) memory block and a multi-level cell MLC memory block, depending on the number of bits that can be stored or expressed in a single memory cell. The plurality of memory blocks may include a pre-read block on which the pre-read operation is performed, a normal read block on which a normal read operation is performed, and an internal read block on which the internal read operation is performed.

Figure 4:
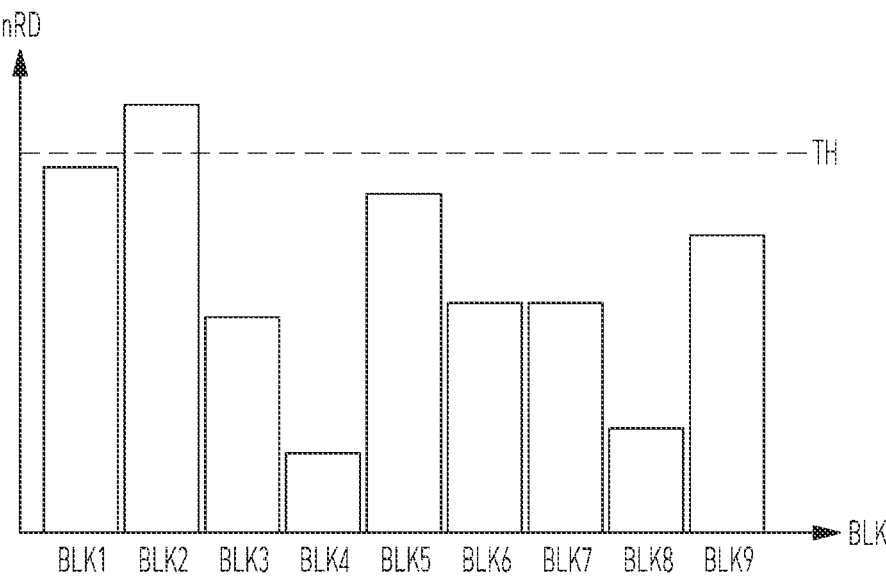
FIG. 4 is a diagram illustrating read reclaim in accordance with an embodiment of the present disclosure.

FIG. 4 is a diagram illustrating read reclaim in accordance with an embodiment of the present disclosure.

In particular, the read reclaim may be performed under the control of the FTL 142 illustrated in FIG. 3.

The read reclaim includes an operation of changing a storage location of data stored in a memory block with a relatively high read count nRD by copying the data to another memory block for safety.

A read count nRD refers to the number of times that the read operation is performed on data stored in a specific memory block. In an embodiment, the read count nRD may be counted by a read counter.

Since a memory block with the read count nRD greater than or equal to a threshold value TH has a high degree of damage, a probability that an error occurs in data stored in the memory block increases. When the read operation is performed multiple times on a specific page included in the memory block, a read disturbance phenomenon may occur in which a cell-level of another page on which the read operation is not performed increases. When the error and read disturbance phenomenon occur accumulatively, a probability that an error exceeding an error correction capability of the ECC unit 138 in FIG. 3 occurs may increase.

The read reclaim refers to migrating and storing valid data, of a victim block into a target block and performing an erase operation on the victim block. The victim block may be a block with the read count nRD greater than or equal to the threshold value TH, whereas the target block may be a block with a relatively low read count nRD. Through this read reclaim, it is possible to prevent unrecoverable errors from occurring in the valid data.

In FIG. 4, the horizontal axis represents numbers of a plurality of memory blocks BLK1 to BLK9 included in the memory device 150, and the vertical axis represents the read count nRD of each of the plurality of memory blocks BLK1 to BLK9 included in the memory device 150.

When the read count nRD exceeds the threshold value TH, a probability that an error occurs in data stored in a corresponding memory block increases. In the illustrated example of FIG. 4, the second memory block BLK2 whose read count nRD is greater than or equal to the threshold value TH may be determined as a bad block BB, and thus a possibility that the second memory block BLK2 might not be used may increase.

As illustrated in FIG. 4, among the plurality of memory blocks BLK1 to BLK9 included in the memory device 150, data stored in the first memory block BLK1, the second memory block BLK2 and the fifth memory block BLK5 each having a relatively high read count nRD may be migrated to the fourth memory block BLK4 having a relatively low read count nRD. This is referred to as normal read reclaim.

In this case, the first memory block BLK1, the second memory block BLK2 and the fifth memory block BLK5 may be referred to as victim blocks (or source blocks) for the read reclaim, whereas the fourth memory block BLK4 may be referred to as a target block for the read reclaim.

In an embodiment, the read reclaim may be performed to ensure the reliability of data stored in a memory block containing uncorrectable errors (UECC) or a memory block in which the number of errors is greater than a reference value.

In the case of the memory block containing uncorrectable errors (UECC) or having the number of errors greater than or equal to the reference value, a probability that error correction of data stored in the memory block becomes impossible increases as time elapses. Accordingly, a probability that an error exceeding the error correction capability of the ECC unit 138 occurs may increase. Therefore, all data or only valid data of the memory block may be migrated to another block. This is referred to as pre-read reclaim and internal read reclaim.

In embodiments of the present disclosure, the read reclaim may be performed in the memory device 150, and thus the valid data might not be stored in the bad block but be stored in the target block, which makes it possible to improve the reliability of the memory device 150 and data stored therein.

As a physical address, which is a storage location of data corresponding to a logical block, is changed through the read reclaim, the physical address of a physical block may become invalid. In this case, the controller 130 may keep a mapping table up-to-date by correcting the mapping table so that the changed physical address instead of the invalidated physical address is mapped to a logical address. Accordingly, in the embodiments of present disclosure, a memory operation may be performed using the up-to-date mapping table through map data management in the memory device, which makes it possible to improve a speed of the memory operation.

Figure 5:
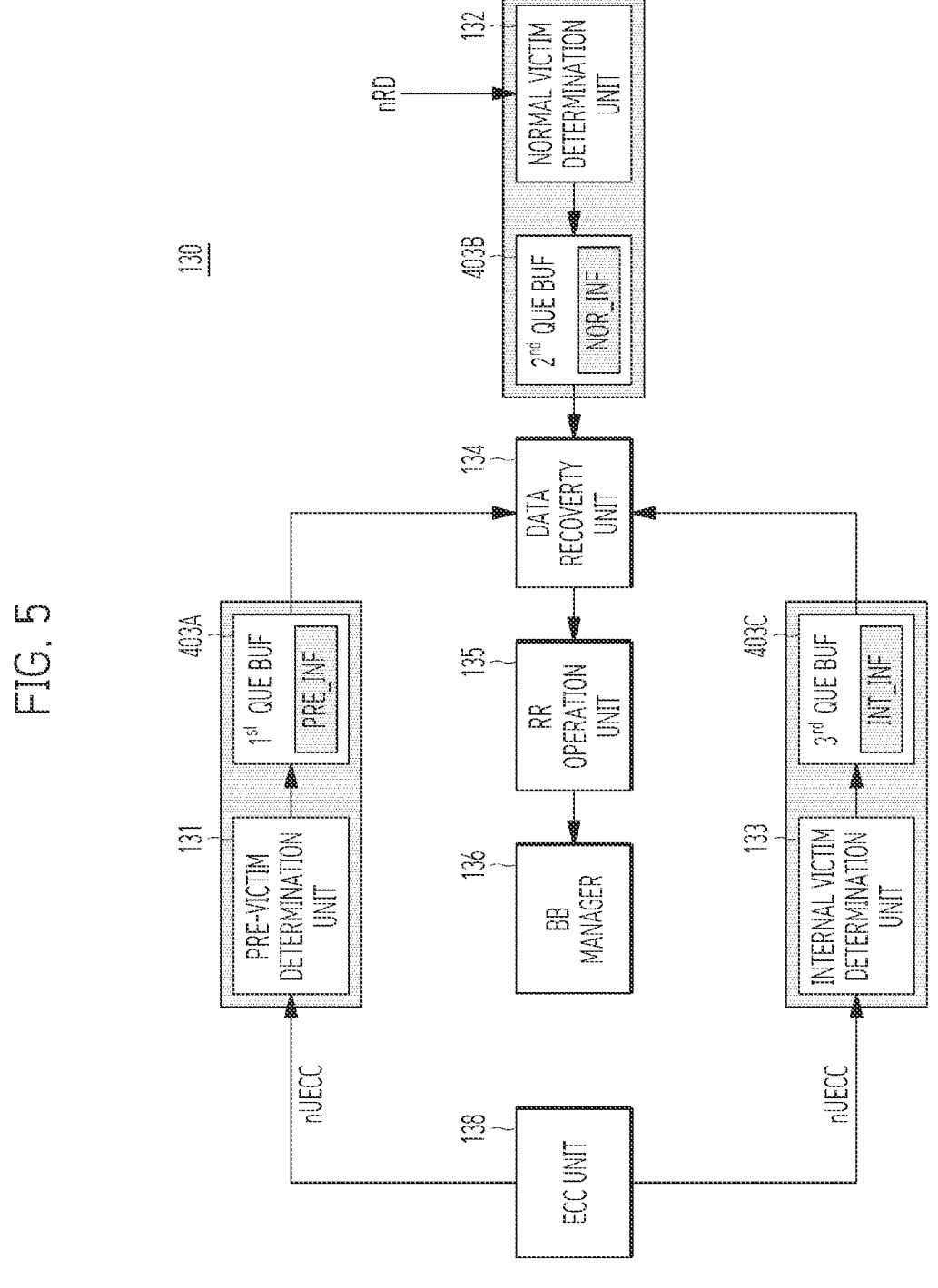
FIG. 5 is a diagram schematically illustrating a controller that performs read reclaim in accordance with an embodiment of the present disclosure.

FIG. 5 is a diagram schematically illustrating the controller 130 that performs the read reclaim in accordance with an embodiment of the present disclosure.

The controller 130 may include a pre-victim determination unit 131, a normal victim determination unit 132, an internal victim determination unit 133, a data recovery unit 134, a read reclaim (RR) operation unit 135, a bad block (BB) manager 136, and an ECC unit 138. The controller 130 may include a first queue buffer 403A, a second queue buffer 403B, and a third queue buffer 403C.

The pre-victim determination unit 131, the normal victim determination unit 132, the internal victim determination unit 133, the data recovery unit 134, the RR operation unit 135, the BB manager 136, and ECC unit 138 include all circuits, systems, software, firmware and devices necessary for their respective operations and functions.

The ECC unit 138 may detect errors of data stored in a memory block, perform an error correction operation on the detected errors, and calculate the number of uncorrectable errors nUECC representing the reliability of the memory block.

The ECC unit 138 might not perform error correction using the ECC when the number of error bits included in one data exceeds a certain level. That is, because the data is beyond the error correction capability of the ECC unit 138, the ECC unit 138 may determine the data to be uncorrectable. The number of uncorrectable errors nUECC may include the number of data determined to be uncorrectable among a plurality of data included in the memory block.

In an embodiment, the controller 130 may determine pre-read blocks, which are targets of a pre-read operation, based on sequential information and a pattern of a read request received from the external device 102. The pre-read operation is a read operation that is performed in advance on sequential data before the read request is received from the external device 102 in order to reduce read latency. Each of the pre-read blocks may be a memory block that stores sequential data with a high possibility of the read request from the external device 102.

The pre-victim determination unit 131 may determine pre-victim blocks on which pre-read reclaim is to be performed, based on the number of uncorrectable errors nUECC of the pre-read blocks calculated by the ECC unit 138 during the pre-read operation. The pre-victim determination unit 131 may determine, as the pre-victim blocks, pre-read blocks each storing uncorrectable data among the pre-read blocks.

The pre-victim determination unit 131 may queue, in the first queue buffer 403A, pre-victim information PRE_INF of the pre-victim blocks according to a determination order of the pre-victim blocks.

The pre-victim information PRE_INF may include an identifier of the pre-victim blocks, a queuing order of the pre-victim information PRE_INF, a read type of the pre-victim blocks, and the number of uncorrectable errors nUECC of the pre-victim blocks.

The read type may include the type of read operation performed to determine a corresponding memory block as a victim block. The read type of pre-victim blocks may be "pre-read".

The controller 130 may perform the pre-read operation on the other pre-read blocks excluding the pre-victim blocks, and store the sequential data stored in the pre-read blocks in the output memory 401 in FIG. 3. Thereafter, when the read request is received from the external device 102, the controller 130 may transmit, to the external device 102, the sequential data stored in the output memory 401.

The normal victim determination unit 132 may determine normal victim blocks on which normal read reclaim is to be performed, based on read counts nRD. The normal victim determination unit 132 may determine, as the normal victim blocks, memory blocks with the read counts nRD greater than or equal to a threshold value among the plurality of memory blocks.

A normal read operation is a read operation according to the read request received from the external device 102. The read count nRD may include the number of read requests received from the external device 102 or the number of times that the normal read operation is performed.

The normal victim determination unit 132 may queue normal victim information NOR_INF of the normal victim blocks in the second queue buffer 403B according to a determination order of the normal victim blocks.

The normal victim information NOR_INF may include at least one of an identifier of the normal victim blocks, a queuing order of the normal victim information NOR_INF, a read type of the normal victim blocks, and the read counts nRD of the normal victim blocks. The read type of pre-victim blocks may be "normal read".

The internal victim determination unit 133 may determine internal victim blocks on which internal read reclaim is to be performed, based on the number of uncorrectable errors nUECC of internal read blocks calculated by the ECC unit 138 during an internal read operation. The internal victim determination unit 133 may determine, as the internal victim blocks, internal read blocks, which store uncorrectable data among the internal read blocks.

The uncorrectable errors UECC due to deterioration of data retention characteristics and read disturbance are highly likely to occur in sleep blocks and weak blocks. Each sleep block may be a block on which the read operation has not been performed for a long time. Each weak block may be a block including weak word lines.

Accordingly, the controller 130 may correct the errors through the ECC operation accompanying the internal read operation in order to prevent the uncorrectable errors UECC from occurring in the sleep blocks and the weak blocks.

The internal read operation may include a media scan operation and a weak block recovery operation.

The media scan operation is an internal read operation to prevent data stored in the sleep blocks from being damaged. The media scan operation may be performed at the request of the external device 102, or may be performed at specific cycles determined by the controller 130. The controller 130 may determine sleep blocks, which include the uncorrectable errors UECC or from which error bits are detected above a certain level, as the internal victim blocks during the media scan operation.

The weak block recovery operation is an internal read operation to prevent data stored in weak pages generated during a manufacturing process of memory blocks from being damaged. The weak blocks are memory blocks each including weak pages with relatively poor threshold voltage characteristics. The controller 130 may determine, as the internal victim blocks, sleep blocks, which include the uncorrectable errors UECC or from which error bits are detected above a certain level, during the weak block recovery operation.

The controller 130 may perform an error correction operation on the sleep blocks and the weak blocks, and migrate the corrected data to another memory block.

The internal victim determination unit 133 may queue, in the third queue buffer 403C, internal victim information INT_INF of the internal victim blocks according to a determination order of the internal victim blocks.

The internal victim information INT_INF may include at least one of an identifier of the internal victim blocks, a queuing order of the internal victim information INT_INF, a read type of the internal victim blocks, and the number of uncorrectable errors nUECC. The read type of internal victim blocks may be "internal read".

The first to third queue buffers 403A to 403C may operate according to a first-in first-out (FIFO) method.

The data recovery unit 134 may perform a data recovery operation on the pre-victim blocks, the normal victim blocks and the internal victim blocks corresponding to victim information stored in the first to third queue buffers 403A to 403C. Accordingly, the uncorrectable errors UECC beyond the error correction capability of the ECC unit 138 may be recovered through the data recovery operation.

The data recovery unit 134 may preferentially perform the data recovery operation on victim blocks corresponding to the victim block information having an early queuing order.

The data recovery unit 134 may set the priority of the data recovery operation on the normal victim blocks to be greater than that of the pre-victim blocks. In addition, the data recovery unit 134 may set the priority of the data recovery operation on the internal victim blocks to be greater than that of the pre-victim blocks. That is, the data recovery unit 134 may perform the data recovery operation on the pre-victim blocks after the data recovery operation is completely performed on the normal victim blocks and the internal victim blocks.

The data recovery unit 134 may perform the data recovery operation on the pre-victim blocks in an idle state in which the memory system 110 does not perform a data input/output operation with the external device 102 after the data recovery operation is completely performed on the normal victim blocks and the internal victim blocks.

After the data recovery operation is completely performed on the normal victim blocks and the internal victim blocks, the data recovery unit 134 may perform the data recovery operation on the pre-victim blocks when an invalidation level of the plurality of memory blocks is less than or equal to a predetermined value, i.e., a low dirty level.

The data recovery unit 134 may perform the data recovery operation on the pre-victim blocks while a force garbage collection (FGC) is performed after the data recovery operation is completely performed on the normal victim blocks and the internal victim blocks. The force garbage collection (FGC) may be performed when an open block in which an error occurs is detected, after the memory system 110 is rebooted due to sudden power-off. The force garbage collection (FGC) may be performed at the request of the external device 102.

The RR operation unit 135 may perform read reclaim on the pre-victim blocks, the normal victim blocks and the internal victim blocks corresponding to the victim information stored in the first to third queue buffers 403A to 403C, respectively.

Even though the uncorrectable errors UECC detected by the ECC unit 138 are recovered through the data recovery operation, the pre-victim blocks, the normal victim blocks and the internal victim blocks are memory blocks having a high probability that the uncorrectable errors UECC occur. Accordingly, the RR operation unit 135 may perform the read reclaim on the pre-victim blocks, the normal victim blocks and the internal victim blocks from which the uncorrectable errors UECC have been recovered. Since the read reclaim is performed on the victim blocks on which the data recovery operation has been performed, the reliability of data migrated to the target block may be high.

According to an embodiment, the present disclosure may include an embodiment in which the read reclaim is performed only on victim blocks whose error recovery failed even through the data recovery operation. That is, the present disclosure may also include an embodiment in which the read reclaim is not performed on victim blocks whose error recovery has been completed through the data recovery operation.

The RR operation unit 135 may set the priority of read reclaim on the normal victim blocks to be greater than that of the pre-victim blocks. In addition, the data recovery unit 134 may set the priority of read reclaim on the internal victim blocks to be greater than that of the pre-victim blocks. That is, the RR operation unit 135 may perform the read reclaim on the pre-victim blocks after data read reclaim is completely performed on the normal victim blocks and the internal victim blocks.

After the read reclaim is completely performed on the normal victim blocks and the internal victim blocks, the RR operation unit 135 may perform the read reclaim on the pre-victim blocks in an idle state in which the memory system 110 does not perform the data input/output operation with the external device 102.

After the read reclaim is completely performed on the normal victim blocks and the internal victim blocks, the RR operation unit 135 may perform the read reclaim on the pre-victim blocks when the invalidation level of the plurality of memory blocks is less than or equal to the predetermined value, i.e., the low dirty level.

After the read reclaim is completely performed on the normal victim blocks and the internal victim blocks, the RR operation unit 135 may perform the read reclaim on the pre-victim blocks while the force garbage collection (FGC) is performed.

The BB manager 136 may process, as a bad block, a victim block containing the uncorrectable errors UECC among the victim blocks on which the read reclaim has been completely performed.

The read count nRD, sequential information and number of uncorrectable errors nUECC described with reference to FIG. 5 may be included in the state information STATE_INF stored in the memory 114 of FIG. 3 used as a buffer/cache memory of the controller 130.

Figure 6:
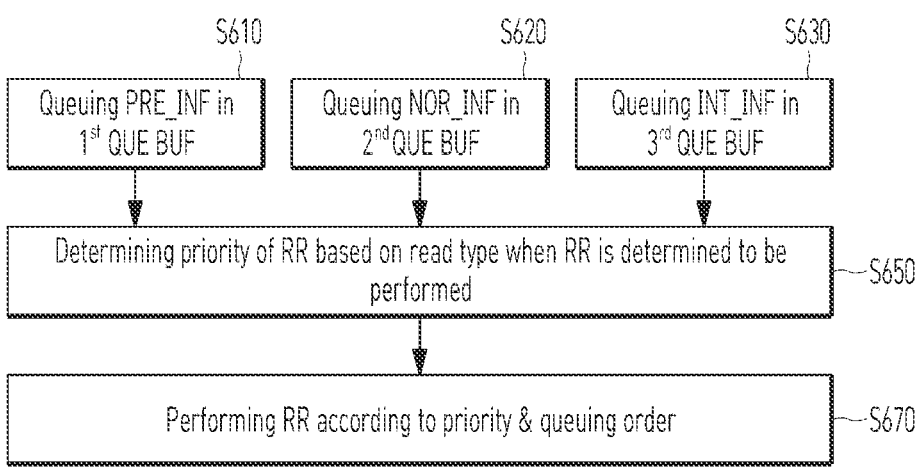
FIG. 6 is a flowchart illustrating read reclaim performed by the controller illustrated in FIG. 5.

FIG. 6 is a flowchart illustrating the read reclaim performed by the controller 130 illustrated in FIG. 5.

Operation S610

The controller 130 may determine the pre-victim blocks based on the number of uncorrectable errors nUECC of the pre-read blocks calculated during the pre-read operation. The controller 130 may queue, in the first queue buffer 403A, the pre-victim information PRE_INF of the pre-victim blocks according to an order determined as the pre-victim blocks, in S610.

Even while the pre-victim information PRE_INF is queued in the first queue buffer 403A, the number of uncorrectable errors nUECC of the pre-victim blocks may change in real time. Accordingly, the controller 130 may update the number of uncorrectable errors nUECC of the pre-victim blocks in real time, and reorder a queuing order of the pre-victim information PRE_INF based on the updated number of uncorrectable errors nUECC.

Operation S620

The controller 130 may determine the normal victim blocks based on the read count nRD. The controller 130 may determine, as the normal victim blocks, memory blocks whose read count nRD is greater than the threshold value TH among memory blocks.

The controller 130 may queue, in the second queue buffer 403B, the normal victim information NOR_INF of the normal victim blocks according to an order determined as the normal victim blocks, in S620.

Even while the normal victim information NOR_INF are queued in the second queue buffer 403B, the read count nRD of the normal victim blocks may change in real time. Accordingly, the controller 130 may update the read count nRD of the normal victim blocks included in the normal victim information NOR_INF in real time, and reorder a queuing order of the normal victim information NOR_INF based on the updated read count nRD.

Operation S630

The controller 130 may determine the internal victim blocks based on the number of uncorrectable errors nUECC of the internal read blocks calculated during the internal read operation.

The controller 130 may queue, in the third queue buffer 403C, the internal victim information INT_INF of the internal victim blocks according to an order determined as the internal victim blocks, in S630.

Even while the internal victim information INT_INF is queued in the third queue buffer 403C, the number of uncorrectable errors nUECC of the internal victim blocks may change in real time. Accordingly, the controller 130 may update the number of uncorrectable errors nUECC of the pre-victim blocks in real time, and reorder a queuing order of the internal victim information INT_INF based on the updated number of uncorrectable errors nUECC.

In some embodiments, the controller 130 may reorder the queuing orders of the pre-victim information PRE_INF, the normal victim information NOR_INF and the internal victim information INT_INF so that the data recovery operation and the read reclaim are preferentially performed on the victim blocks with a large number of uncorrectable errors nUECC.

In some embodiments, the controller 130 may queue the pre-victim information PRE_INF, the normal victim information NOR_INF and the internal victim information INT_INF in one queue buffer of 403 in FIG. 3.

Operation S650

When it is determined to perform the read reclaim, the controller 130 may determine the priority of the read reclaim (RR) according to a read type RD_TYPE of the victim blocks, in S650. In this case, the controller 130 may determine the priority of the pre-victim blocks to be less than that of the normal victim blocks and the internal victim blocks.

Operation S670

The controller 130 may perform the read reclaim on the victim blocks according to the priority determined in S650 and the queuing orders reordered through the data recovery operation in S650.

The reordered queuing orders may be changed in real time even while operations S610 to S670 are carried out.

The controller 130 may perform the data recovery operation on the victim blocks before the read reclaim is performed in S670.

Figure 7A:
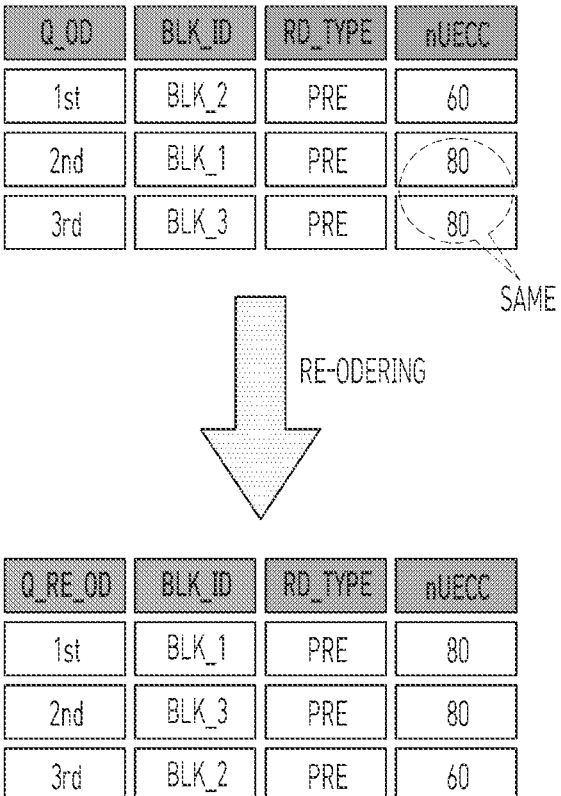
FIGS. 7A and 7B are diagrams illustrating a method for reordering victim information in accordance with a first embodiment of the present disclosure.
Figure 7B:
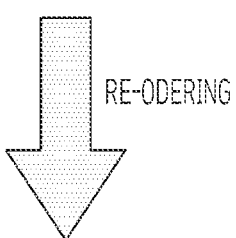

FIGS. 7A and 7B are diagrams illustrating a method for reordering victim information in accordance with a first embodiment of the present disclosure.

FIG. 7A illustrates an example of the pre-victim information PRE_INF queued in the first queue buffer 403A.

In the illustrated example in FIG. 7A, the pre-victim information PRE_INF may include an identifier BLK_ID of the pre-victim blocks, a queuing order Q_OD of the pre-victim information PRE_INF, a read type RD_TYPE of the pre-victim blocks, and the number of uncorrectable errors nUECC included in the pre-victim blocks.

The pre-victim information PRE_INF for a second pre-victim block PRE_BLK_2, a first pre-victim block PRE_BLK_1 and a third pre-victim blocks PRE_BLK_3 may be sequentially queued in the first queue buffer 403A according to the queuing order Q_OD: PRE_BLK_2→PRE_BLK_1→PRE_BLK_3. In this case, the queuing order Q_OD may refer to the order in which the second pre-victim block PRE_BLK_2, the first pre-victim block PRE_BLK_1 and the third pre-victim block PRE_BLK_3 are determined as the pre-victim blocks.

The number of uncorrectable errors nUECC of the first pre-victim block PRE_BLK_1 and the third pre-victim block PRE_BLK_3 is the highest (e.g., 80), and the number of uncorrectable errors nUECC of the second pre-victim block PRE_BLK_2 is the lowest (e.g., 60), where the number of uncorrectable errors nUECC is PRE_BLK_1=PRE_BLK_3>PRE_BLK_2.

The controller 130 may reorder the queuing order of pre-victim blocks PRE_BLK according to the number of uncorrectable errors nUECC. Accordingly, the controller 130 may reorder the queuing order in order of the first pre-victim block PRE_BLK_1, the third pre-victim block PRE_BLK_3 and the second pre-victim block PRE_BLK_2.

However, since the number of uncorrectable errors nUECC of the first pre-victim block PRE_BLK_1 is equal to the number of uncorrectable errors nUECC of the third pre-victim block PRE_BLK_3, the controller 130 may reorder the queuing order of the pre-victim information PRE_INF by reflecting not only the number of uncorrectable errors nUECC but also the queuing order Q_OD.

The controller 130 may reorder the queuing order of the first pre-victim block PRE_BLK_1, which has the longest queuing time in the first queue buffer 403A, to be greater than that of the third pre-victim block PRE_BLK_3. That is, the reordered queuing order is Q_RE_OD: PRE_BLK_1→PRE_BLK_3→PRE_BLK_2. Accordingly, the controller 130 may perform the pre-read reclaim performed on the pre-victim blocks PRE_BLK in the order of "PRE_BLK_1→PRE_BLK_3→PRE_BLK_2".

FIG. 7B illustrates an example of the normal victim information NOR_INF queued in the second queue buffer 403B.

As illustrated in FIG. 7B, the normal victim information NOR_INF may include an identifier BLK_ID of the normal victim blocks, a queuing order Q_OD of the normal victim information NOR_INF, a read type RD_TYPE of the normal victim blocks, and a degree of damage. In the present embodiment, the degree of damage may include the read count nRD.

The normal victim information NOR_INF for a sixth normal victim block NOR_BLK_6, a fifth normal victim block NOR_BLK_5 and a fourth normal victim block NOR_BLK_4 may be sequentially queued in the second queue buffer 403B according to the queuing order Q_OD: NOR_BLK_6→NOR_BLK_5→NOR_BLK_4.

The queuing order Q_OD may refer to the order in which the sixth normal victim block NOR_BLK_6, the fifth normal victim block NOR_BLK_5 and the fourth normal victim block NOR_BLK_4 are determined as the normal victim blocks.

The read count nRD of the fourth normal victim block NOR_BLK_4 is the highest (e.g., 100), and the read count nRD of the sixth normal victim block NOR_BLK_6 is the lowest (e.g., 50). The read count nRD of the fifth normal victim block NOR_BLK_5 may be medium (e.g., 80). That is, the order of the read count is nRD: NOR_BLK_4>NOR_BLK_5>NOR_BLK_6.

The controller 130 may reorder the queuing order of the normal victim information NOR_INF according to the read count nRD. Accordingly, the controller 130 may reorder the queuing order in the order of the fourth normal victim block NOR_BLK_4, the fifth normal victim block NOR_BLK_5 and the sixth normal victim block NOR_BLK_6 such that the reorder queuing order is Q_RE_OD: NOR_BLK_4→NOR_BLK_5→NOR_BLK_6. Accordingly, the controller 130 may perform the normal read reclaim performed on the normal victim blocks in the order of "NOR_BLK_4→NOR_BLK_5→NOR_BLK_6".

As such, in the descriptions of FIGS. 7A and 7B, since the pre-victim information PRE_INF is stored in the first queue buffer 403A and the normal victim information NOR_INF is stored in the second queue buffer 403B, the controller 130 may set the priority of the read reclaim for the first queue buffer 403A to be less than the priority of the read reclaim for the second queue buffer 403B.

Although not illustrated in FIGS. 7A and 7B, the controller 130 may set the priority of the read reclaim for the first queue buffer 403A to be less than the priority of the read reclaim for the third queue buffer 403C where the internal victim information INT_INF is stored. Accordingly, the controller 130 may determine the priority of the normal read reclaim and the internal read reclaim as a "first priority" and the priority of the pre-read reclaim as a "second priority".

Figure 8:
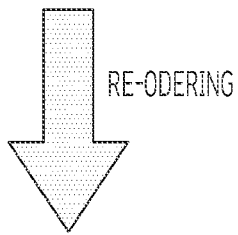
FIG. 8 is a diagram illustrating a method for reordering victim information in accordance with a second embodiment of the present disclosure.

FIG. 8 is a diagram illustrating a method for reordering victim information in accordance with a second embodiment of the present disclosure.

FIG. 8 is a diagram illustrating an example of an operation of determining the read reclaim priority of pre-victim information PRE_INF and normal victim information NOR_INF stored in one queue buffer 403.

Referring to FIG. 8, the normal victim information NOR_INF and the pre-victim information PRE_INF are queued in one queue buffer 403 according to a determined order.

The victim information on the second pre-victim block PRE_BLK_2, the sixth normal victim block NOR_BLK_6, the first pre-victim block PRE_BLK_1, the fifth normal victim block NOR_BLK_5, the third pre-victim block PRE_BLK_3 and the fourth normal victim block NOR_BLK_4 may be sequentially queued in the queue buffer 403. That is, the queuing order is Q_OD: PRE_BLK_2→NOR_BLK_6→PRE_BLK_1→NOR_BLK_5→PRE_BLK_3→NOR_BLK_4.

The queuing order Q_OD may refer to the order in which the second pre-victim block PRE_BLK_2, the sixth normal victim block NOR_BLK_6, the first pre-victim block PRE_BLK_1, the fifth normal victim block NOR_BLK_5, the third pre-victim block PRE_BLK_3 and the fourth normal victim block NOR_BLK_4 are determined as the victim blocks.

When the performance of the read reclaim is determined, the controller 130 may determine the read reclaim priority PRIOITY of the pre-victim information PRE_INF and normal victim information NOR_INF according to the read type RD_TYPE.

The controller 130 may determine the priority PRIOITY of the normal victim blocks whose read type RD_TYPE is "normal read NOR" to be greater than that of the pre-victim blocks whose read type RD_TYPE is "pre-read PRE".

The controller 130 may reorder the queuing order of pre-victim blocks PRE_BLK according to the priority PRIOITY. In addition, the controller 130 may reorder the queuing order according to not only the priority PRIOITY but also the number of uncorrectable errors nUECC and the read count nRD. Moreover, the controller 130 may reorder the queuing order by additionally reflecting the queuing order Q_OD.

The controller 130 may reorder the queuing order in the order of the fourth normal victim block NOR_BLK_4, the fifth normal victim block NOR_BLK_5, the sixth normal victim block NOR_BLK_6, the first pre-victim block PRE_BLK_1, the third pre-victim block PRE_BLK_3 and the second pre-victim block PRE_BLK_2. Accordingly, the controller 130 may perform the read reclaim in the order of "NOR_BLK_4→NOR_BLK_5→NOR_BLK_6→ PRE_BLK_1→PRE_BLK_3→PRE_BLK_2."

As described above, the controller 130 may set a priority of pre-reclaim for the pre-victim information PRE_INF stored in the queue buffer 403 to be less than a priority of normal reclaim for the normal victim information NOR_INF. In addition, although not illustrated in FIG. 8, the controller 130 may set the priority of the pre-reclaim for the pre-victim information PRE_INF stored in the queue buffer 403 to be less than a priority of internal reclaim for the internal victim information INT_INF. Accordingly, the controller 130 may determine the priority of the normal read reclaim and the internal read reclaim as a "first priority" and the priority of the pre-read reclaim as a "second priority".

Figure 9:
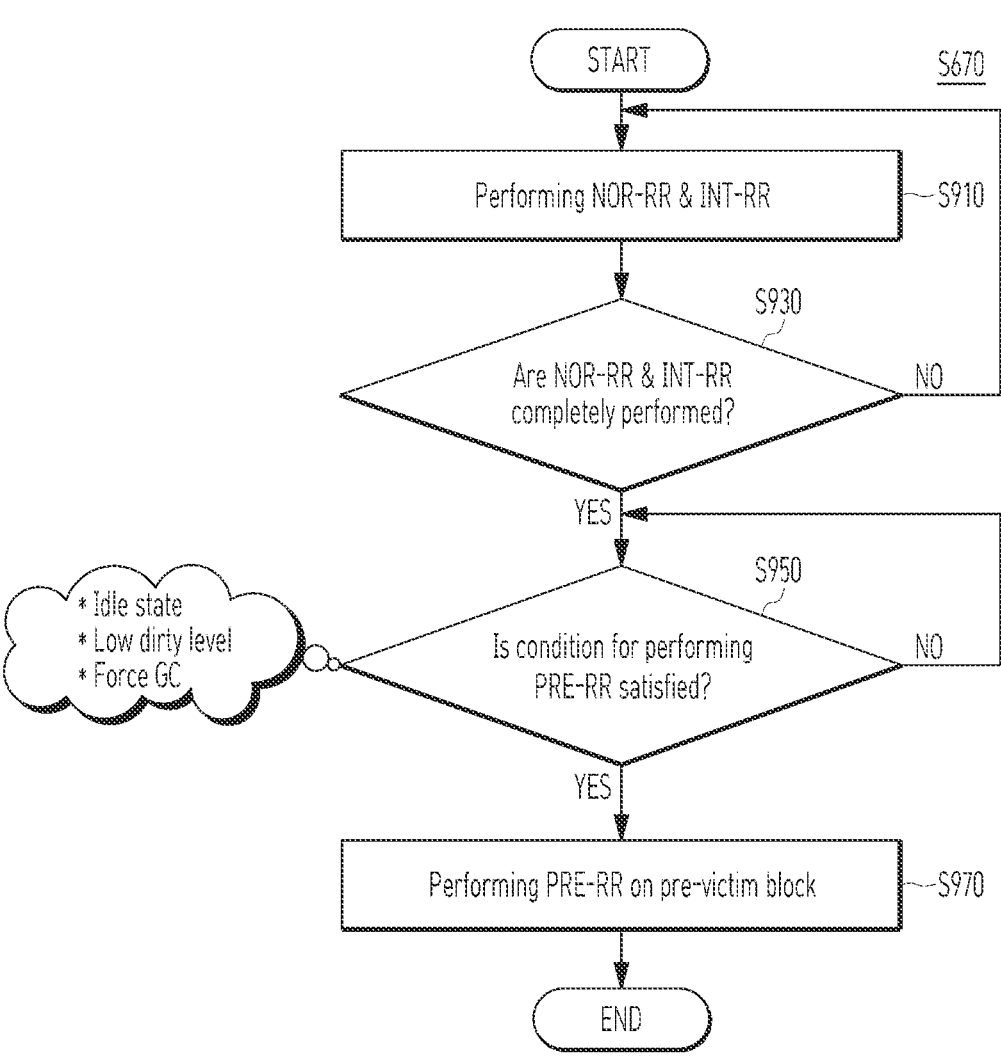
FIG. 9 is a flowchart illustrating read reclaim performed according to a priority illustrated in FIG. 6.

FIG. 9 is a flowchart illustrating the read reclaim S670 performed according to the priority illustrated in FIG. 6.

The controller 130 may control the memory device 150 to perform the read reclaim according to the reordered queuing orders and determined priorities of the first to third queue buffers 403A to 403C.

Referring to FIG. 9, the controller 130 may preferentially perform the read reclaim on the normal victim blocks NOR_BLK and the internal victim blocks INT_BLK over the pre-victim blocks according to the determined priorities. In FIG. 9, NOR-RR represents the read reclaim on the normal victim blocks NOR_BLK, and INT-RR represents the read reclaim on the internal victim blocks INT_BLK.

The controller 130 may preferentially perform the read reclaim on the normal victim blocks NOR_BLK and the internal victim blocks INT_BLK according to the reordered queuing orders of the normal victim information NOR_INF and internal victim information INT_INF, in S910. Before S910, the data recovery operation may be performed on the normal victim blocks NOR_BLK and the internal victim blocks INT_BLK.

The controller 130 may determine whether the normal read reclaim NOR-RR and the internal read reclaim INT-RR have been completely performed, in S930.

When the normal read reclaim and the internal read reclaim have been completely performed, the controller 130 may determine whether a condition for performing the pre-read reclaim is satisfied, in S950. The condition for performing the pre-read reclaim may include a case where the memory system 110 is in an idle state, a case where a plurality of memory blocks each have a low dirty level, and a case where force garbage collection (FGC) is performed.

When the normal read reclaim NOR-RR and the internal read reclaim INT-RR have been completely performed and the memory system 110 satisfies the condition for performing the pre-read reclaim PRE-RR, the controller 130 may perform the pre-read reclaim PRE-RR on the pre-victim blocks PRE_BLK according to the reordered queuing order of the pre-victim information PRE_INF, in S970. Before S970, the data recovery operation may be performed on the pre-victim blocks PRE_BLK.

Since the pre-read reclaim is performed after the normal read reclaim is completely performed, the pre-read reclaim might not affect the normal read reclaim. Accordingly, the pre-read reclaim might not affect the data input/output operation performed by the external device 102 and the memory system 110.

In addition, since the pre-read reclaim is performed after the internal read reclaim is completely performed, the pre-read reclaim might not affect the internal read reclaim. Accordingly, the pre-read reclaim might not affect an operation of improving the reliability of sleep blocks and weak blocks, which have a high probability of occurrence of uncorrectable errors UECC due to deterioration of data retention characteristics and read disturbance.

Figure 10:
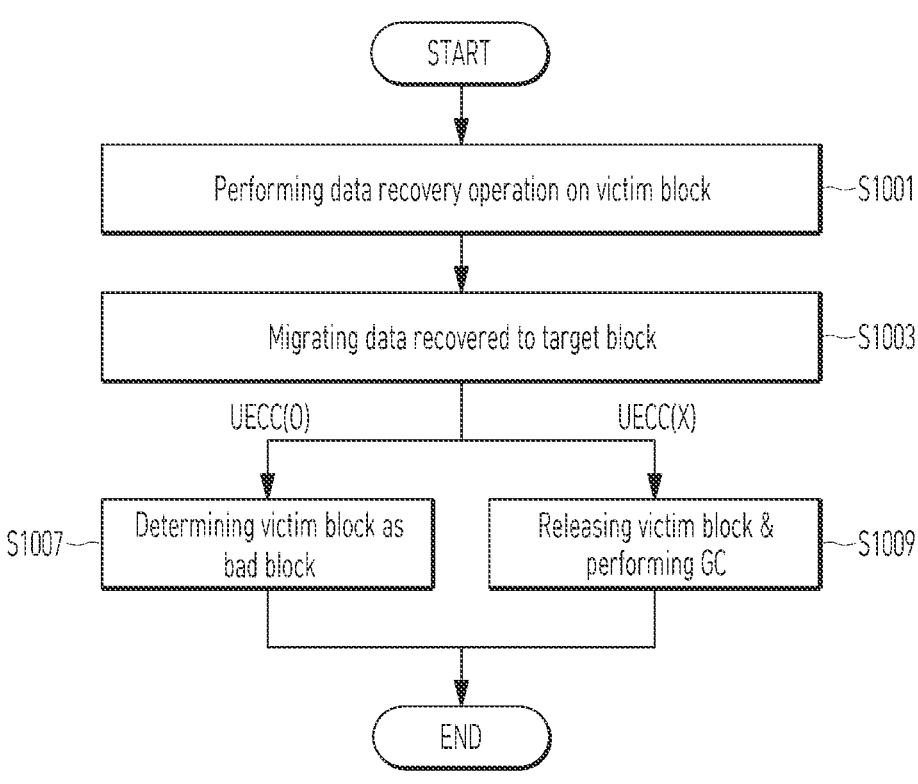
FIG. 10 is a flowchart illustrating a detailed operation of reclaim in accordance with an embodiment of the present disclosure.

FIG. 10 is a flowchart illustrating a detailed operation of reclaim in accordance with an embodiment of the present disclosure.

Particularly, FIG. 10 illustrates methods of the pre-reclaim, normal reclaim and internal reclaim.

The controller 130 may perform the data recovery operation for error recovery on victim blocks, in S1001.

The controller 130 may migrate, to a target block for read reclaim, data from which errors have been recovered through the data recovery operation, in S1003.

The controller 130 may divide the victim blocks into blocks that contain uncorrectable errors UECC and blocks that do not contain the uncorrectable errors UECC.

The controller 130 may process the victim blocks containing the uncorrectable errors UECC as bad blocks BB in S1007. The victim blocks that have been processed as the bad blocks BB might not be used as storage space for data storage.

The controller 130 may release the victim blocks that do not contain the uncorrectable errors UECC, in S1009. In addition, the controller 130 may perform the garbage collection (GC), and convert the victim blocks into free blocks for data storage.

Figure 11:
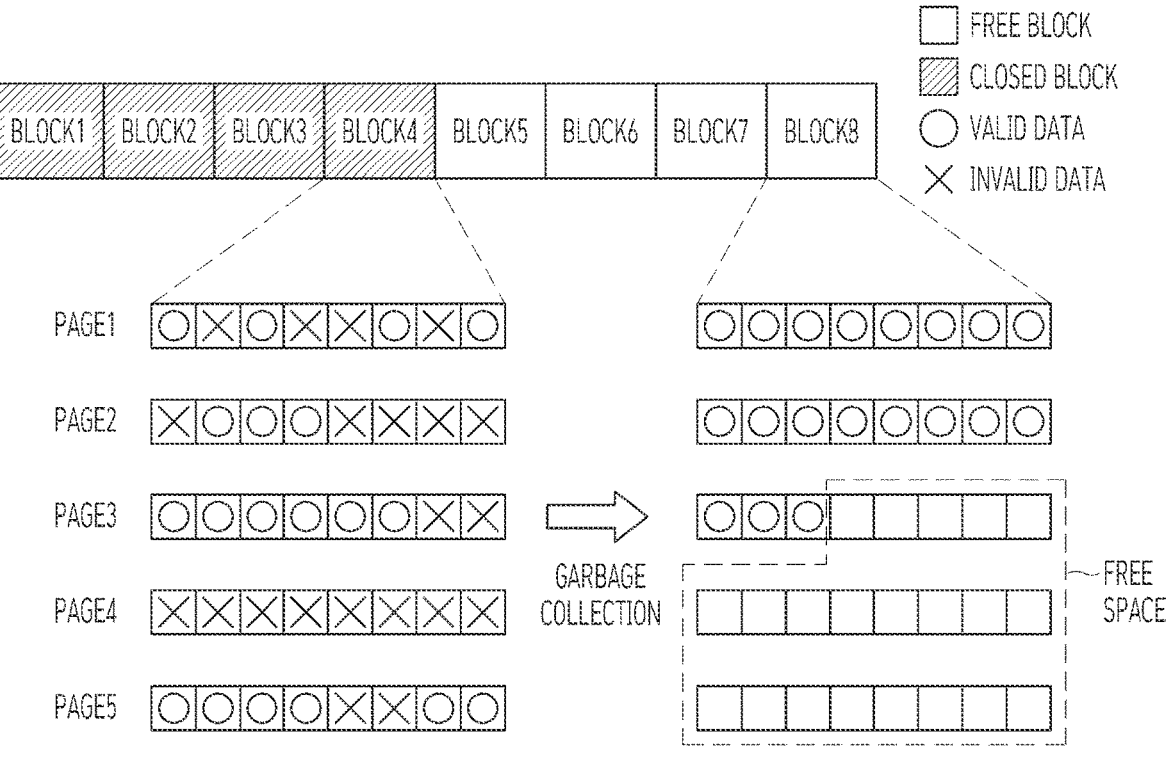
FIG. 11 is a diagram illustrating garbage collection in accordance with an embodiment of the present disclosure.

FIG. 11 is a flowchart illustrating garbage collection in accordance with an embodiment of the present disclosure.

Since valid data read from pre-victim blocks, normal victim blocks and internal victim blocks are migrated and stored in a target block, the controller 130 may perform an erase operation on the pre-victim blocks, the normal victim blocks and the internal victim blocks, and secure the pre-victim blocks and the normal victim blocks as free blocks. The erase operation may be performed through the garbage collection.

The garbage collection includes an operation of migrating, to a target block, data stored in a memory block including valid data and then erasing the memory block.

A memory device 150 illustrated in FIG. 11 includes first to eighth memory blocks BLOCK1 to BLOCK8, and each of the first to eighth memory blocks BLOCK1 to BLOCK8 includes first to fifth pages. PAGE1 to PAGE5.

Referring to FIG. 11, the first to fourth memory blocks BLOCK1 to BLOCK4 may be closed blocks in which data are stored, and the fifth to eighth memory blocks BLOCK5 to BLOCK8 may be free blocks in which data are not stored.

As illustrated in FIG. 11, valid data and invalid data may be distributed and stored in the first to fifth pages PAGE1 to PAGE5 of the fourth memory block BLK4.

In this case, the controller 130 may copy the valid data stored in the fourth memory block BLK4 to the eighth memory block BLK8, which is the free block, and then perform the erase operation on the fourth memory block BLK4, thereby securing the fourth memory block BLK4 as the free block. Accordingly, storage space for memory blocks may be secured.

Space remaining after storing the valid data of the fourth memory block BLK4 in the eighth memory block BLK8 may be secured as free space. In this case, the fourth memory block BLK4, which is a target of the garbage collection, may be referred to as a victim block or a source block of the garbage collection, and the eighth memory block BLK8 may be referred to as a target block of the garbage collection.

In addition, since the valid data of the fourth memory block BLK4 has been migrated to the eighth memory block BLK8, all data of the fourth memory block BLK4 may be erased and be regarded as the free block.

As such, the operation of migrating, to a free block, data stored in a memory block in which valid data are scattered and then erasing the data of the memory block may be referred to as the garbage collection.

According to embodiments of the present disclosure, the number of free blocks may increase through garbage collection performed on a memory device, which makes it possible to improve data storage efficiency of the memory device.

According to embodiments of the present disclosure, a memory block having low reliability, which is detected during a pre-read operation, may be determined as a victim block for read reclaim. Accordingly, resources and time consumed to determine the victim block may be efficiently reduced.

According to embodiments of the present disclosure, a priority of a pre-victim block determined during a pre-read operation may be lower than that of a normal victim block determined through a normal read operation. Accordingly, pre-read reclaim might not affect normal read reclaim.

Although embodiments of the present disclosure have been described by specific examples and limited embodiments in the present specification, the embodiments have been provided only for assisting the entire understanding of the present disclosure, and the present disclosure is not limited to the embodiments herein. Various modifications and changes may be made from the present specification by those skilled in the art to which the present disclosure pertains and those modifications and changes should be considered part of the present disclosure. Furthermore, the embodiments may be combined to form additional embodiments.

What is claimed is:

1. A memory system comprising:
   a memory device including a plurality of memory blocks; and
   a controller suitable for controlling the memory device to perform pre-read reclaim on pre-victim blocks of pre-read blocks among the plurality of memory blocks, the pre-victim blocks including uncorrectable errors, the pre-read blocks being blocks on which a pre-read operation for sequential data having a high possibility of being read requested consecutively by an external device has been performed,
   wherein the controller sets a priority of a normal read reclaim to be greater than the pre-read reclaim thereof, and
   wherein the normal read reclaim is performed on normal victim blocks for which the number of read requests from the external device is greater than or equal to a threshold.

2. The memory system of claim 1, wherein the controller controls the memory device to perform the pre-read reclaim after at least one read reclaim is performed among a normal read reclaim and an internal read reclaim, the internal read reclaim being performed on internal victim blocks determined during an internal read operation which has been performed.

3. The memory system of claim 1, wherein the controller controls the memory device to perform the pre-read reclaim when the memory system is in an idle state of not performing a data input and output operation with the external device.

4. The memory system of claim 1, wherein the controller controls the memory device to perform the pre-read reclaim when an invalidation level of data stored in the plurality of memory blocks is less than or equal to a predetermined value.

5. The memory system of claim 2, wherein the controller controls the memory device to perform the pre-read reclaim when force garbage collection is performed.

6. The memory system of claim 1, wherein the controller controls the memory device to perform the pre-read reclaim on the pre-victim blocks on which a data recovery operation has been performed.

7. The memory system of claim 6, wherein the controller processes, as bad blocks, pre-victim blocks which store data whose error recovery has failed, among the pre-victim blocks on which the pre-read reclaim has been performed.

8. The memory system of claim 2, wherein the controller determines the priority of the normal read reclaim and the internal read reclaim to be greater than the pre-read reclaim.

9. The memory system of claim 8, wherein the controller reorders a read reclaim order based on the priority, the number of read requests updated in real time, and the number of uncorrectable errors, the read reclaim order indicating an order in which each of the pre-read reclaim, the normal read reclaim and the internal read reclaim is performed.

10. The memory system of claim 2, wherein the controller includes queue buffers in which first information on the pre-victim blocks, second information on the normal victim blocks and third information on the internal victim blocks are queued.

11. The memory system of claim 2, wherein the controller includes:
   a first queue buffer in which information on the pre-victim blocks is queued;
   a second queue buffer in which information on the normal victim blocks is queued; and
   a third queue buffer in which information on the internal victim blocks is queued.

12. A memory system comprising:
   a memory device including a plurality of memory blocks; and
   a controller suitable for:
   calculating the number of uncorrectable errors included in each of pre-read blocks,
   determining, as pre-victim blocks, the pre-read blocks including the uncorrectable errors, among the plurality of memory blocks, and
   controlling the memory device to perform pre-read reclaim on the pre-victim blocks,
   wherein each of the pre-read blocks stores sequential data for sequential data having a high possibility of being read requested consecutively by an external device when a pre-read operation is determined to be performed,
   wherein the controller sets a priority of a normal read reclaim to be greater than the pre-read reclaim thereof, and
   wherein the normal read reclaim is performed on normal victim blocks for which the number of read requests from the external device is greater than or equal to a threshold.

13. The memory system of claim 12, wherein the controller determines, among the plurality of memory blocks, the normal victim blocks for which the number of read requests from the external device is greater than or equal to the threshold and on which a normal read operation is performed, and controls the memory device to perform the normal read reclaim on the normal victim blocks.

14. The memory system of claim 12, wherein the controller performs the pre-read reclaim after a data recovery operation is performed on the pre-victim blocks.

15. The memory system of claim 14, wherein the controller processes, as bad blocks, pre-victim blocks, which store errors that are not recovered through the data recovery operation.

16. The memory system of claim 13, further comprising a queue buffer in which pre-victim information on the pre-victim blocks is queued according to a determination order of the pre-victim blocks, and normal victim information on the normal victim blocks is queued according to a determination order of the normal victim blocks.

17. The memory system of claim 16, wherein the queue buffer includes:

a first queue buffer in which information on the pre-victim blocks is queued; and a second queue buffer in which information on the normal victim blocks is queued.

18. The memory system of claim 16, wherein the controller reorders queuing orders of the pre-victim information and the normal victim information based on the priority, the number of uncorrectable errors updated in real time, and the number of read requests.

19. The memory system of claim 18, wherein the controller performs the pre-read reclaim and the normal read reclaim according to the reordered queuing orders.

20. The memory system of claim 13, wherein the controller performs the pre-read reclaim in one of a first state in which the memory system does not perform a data input/output operation with the external device, a second state in which an invalidation level of data stored in the plurality of memory blocks is equal to or less than a predetermined value, and a third state in which force garbage collection is performed, after the normal read reclaim is completely performed.

\* \* \* \* \*